United States Patent
Choi et al.

(10) Patent No.: US 7,307,678 B2
(45) Date of Patent: Dec. 11, 2007

(54) LIQUID CRYSTAL DISPLAY AND FABRICATING METHOD THEREOF

(75) Inventors: Suk Won Choi, Kyounggi-do (KR); Hong Chul Kim, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/649,738

(22) Filed: Aug. 28, 2003

(65) Prior Publication Data

US 2004/0085502 A1 May 6, 2004

(30) Foreign Application Priority Data

Oct. 30, 2002 (KR) ...................... 10-2002-0066583

(51) Int. Cl.
G02F 1/1335 (2006.01)
G02F 1/1337 (2006.01)

(52) U.S. Cl. .................. 349/99; 349/123; 349/124; 349/100

(58) Field of Classification Search ............... 349/123, 349/132–134, 172, 99–100, 124
See application file for complete search history.

(56) References Cited

U.S. PATENT DOCUMENTS

| | | | | |
|---|---|---|---|---|
| 4,639,089 A * | 1/1987 | Okada et al. | ............... | 350/341 |
| 4,712,873 A | 12/1987 | Kanbe et al. | | |
| 4,879,059 A * | 11/1989 | Hanyu et al. | ............. | 252/299.4 |
| 5,504,600 A * | 4/1996 | Pirs et al. | ...................... | 359/51 |
| 5,514,426 A * | 5/1996 | Eguchi | ....................... | 428/1.4 |
| 5,618,592 A * | 4/1997 | Nagae et al. | ................... | 428/1 |
| 5,844,652 A * | 12/1998 | Takatori | ...................... | 349/139 |
| 5,973,762 A * | 10/1999 | Vorfloussev | ................. | 349/133 |
| 6,015,507 A | 1/2000 | Kobayashi et al. | .... | 252/299.01 |
| 6,108,061 A * | 8/2000 | Sako et al. | ..................... | 349/85 |
| 6,151,090 A * | 11/2000 | Tanaka et al. | .............. | 349/134 |
| 6,351,301 B1 * | 2/2002 | Takatori | ...................... | 349/172 |
| 6,429,914 B1 * | 8/2002 | Kubota et al. | ................ | 349/86 |
| 6,436,490 B1 * | 8/2002 | Nishimura et al. | .......... | 428/1.1 |
| 6,545,738 B2 * | 4/2003 | Son et al. | ..................... | 349/172 |
| 6,614,491 B2 * | 9/2003 | Hasegawa et al. | ............ | 349/37 |
| 6,704,086 B1 | 3/2004 | Dübal et al. | | |
| 2002/0191137 A1 * | 12/2002 | Kondoh | ....................... | 349/123 |
| 2003/0011732 A1 * | 1/2003 | Ishihara et al. | ............. | 349/117 |

FOREIGN PATENT DOCUMENTS

CN 1305604 7/2001
JP 10-288786 10/1998

\* cited by examiner

*Primary Examiner*—Mike Qi
(74) *Attorney, Agent, or Firm*—Morgan, Lewis & Bockius LLP

(57) ABSTRACT

A liquid crystal display includes a liquid crystal injected between upper and lower plates, wherein the upper and lower plates have electrodes respectively formed thereon, an upper alignment film formed on the upper plate and a lower alignment film formed on the lower plate, wherein only one of the alignment films on the upper plate and the lower plate is aligned in to determine an incipient alignment direction of the liquid crystal.

7 Claims, 9 Drawing Sheets

ELECTRIC FIELD ALIGNMENT

E(−) ↓

APPLYING AN EXTERNAL ELECTRIC FIELD

— ONE SIDE(APPLYING ELECTRIC FIELD)
—— ONE SIDE(NOT APPLYING ELECTRIC FIELD)
----- BOTH SIDES(APPLYING ELECTRIC FIELD)

FIG.10A

ONE SIDE RUBBING OF THE UPPER/LOWER PLATE

ELECTRIC FIELD ALIGNMENT ⇒

FIG.10B

BOTH OF THE UPPER/LOWER PLATE RUBBING

ELECTRIC FIELD ALIGNMENT ⇒

LIQUID CRYSTAL DISPLAY AND FABRICATING METHOD THEREOF

The present invention claims the benefit of Korean Patent Application No. P2002-66583 filed in Korea on Oct. 30, 2002, which is hereby incorporated by reference.

BACKGROUND OF THE INVENTION

1. Field of the Invention

The present invention relates to a liquid crystal display and more particularly to a liquid crystal display and a fabricating method thereof capable of improving brightness and contrast.

2. Description of the Related Art

In general, a liquid crystal display LCD displays pictures by applying an electric field to the liquid crystal in response to a video signal to control an arrangement state of the liquid crystal, thereby adjusting a light transmittance in accordance with a video signal. The liquid crystal used in the liquid crystal display has a mid-state between solid and liquid thus having fluidity as well as elasticity. To date, the liquid crystal typically used in liquid crystal display is a twisted nematic mode (TN mode). Although the response speed of the twisted nematic mode may be different in accordance with the physical property of a particular type of liquid crystal material, such as cell gap, the response speed of the twisted nematic mode is longer than one 16.67 ms frame, as specified by National Television System Committee (NTSC) in a moving picture. Therefore, when the moving picture is displayed on the liquid crystal display of the twisted nematic mode, motion blurring, in which picture is seen ambiguously, and tailing seriously appears in the displayed picture.

In contrast with the twisted nematic mode above, the liquid crystal cell having a ferroelectric liquid crystal FLC injected therein readily implements moving pictures because its response speed is faster than that of the liquid crystal cells of any mode, including the twisted nematic mode. The ferroelectric liquid crystal inherently achieves permanent polarization, such as spontaneous polarization, without an external electric field. Therefore, when the external electric field is applied to the ferroelectric liquid crystal, the ferroelectric liquid crystal rotates rapidly because of the interaction between the external field and the spontaneous polarization. Thus, the response speed of ferroelectric liquid crystal is hundreds or thousands of times faster than that of the other liquid crystal modes.

The ferroelectric liquid crystal has a layer structure in which the electric and the magnetic properties are the same. The ferroelectric liquid crystal is driven by rotating individual crystals of the liquid crystal along a line of a virtual cone in response to the electric field. Since the ferroelectric liquid crystal has an in-plane-switching property in and of itself, a wide-viewing-angle can be implemented without having a special electrode structure or a compensation film.

Figure 1:
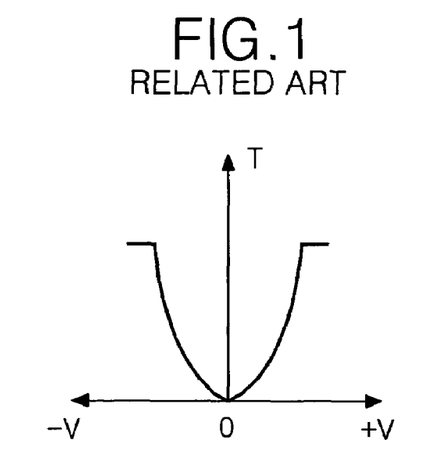
FIG. 1 is a graph illustrating a voltage vs. transmittance characteristic for a ferroelectric liquid crystal of V-Switching mode.

Ferroelectric liquid crystal is classified into either a V-Switching Mode or a Half V-Switching Mode according to the characteristic response in reaction to the a polarity of the electric field. In the ferroelectric liquid crystal cell of V-Switching Mode, as the temperature is lowered, there occurs a thermodynamical phase transition, such as a sequence of an isotropic→a smectic A phase SA→a smectic X phase Sm X*→a crystal . Isotropic is the state in which liquid crystal molecules does not have direction or location order. The smectic A phase is a state in which the liquid crystal molecules are divided into a virtual layer and arranged vertically in the virtual layer and have an up and down symmetry. The smectic X phase is a middle state between the smectic A phase and the crystal phase. FIG. 1 is a graph illustrating a voltage versus transmittance characteristic for a ferroelectrics liquid crystal of V-Switching mode. The ferroelectric liquid crystal cell of V-Switching Mode in which the liquid crystal molecule is transited to the smectic X phase, as shown in FIG. 1, improves the light beam transmittance of incident light by changing the arrangement state responding to an external voltage of positive polarity +V and an external voltage of negative polarity −V.

The ferroelectric liquid crystal cell of the V-Switching Mode has the advantages of high-speed-response characteristic and wide-viewing-angle characteristic but has a defect in that a large amount of power is needed to drive a liquid crystal cell because the spontaneous polarization value is large. Further, the capacitance of a storage capacitor to maintain the data voltage has to be large. Accordingly, if the V-Switching Mode is used in a liquid crystal display, the aperture ratio becomes low since an electrode area of auxiliary capacitor becomes large. In contrast with the V-Switching Mode above, the ferroelectric liquid crystal cell of the Half V-Switching Mode has the advantages of a high-speed-response characteristic and a wide-viewing-angle characteristic. Further, a moving picture can be displayed with a high aperture ratio because capacitance is relatively small and thus requires less electrode area.

Figure 2:
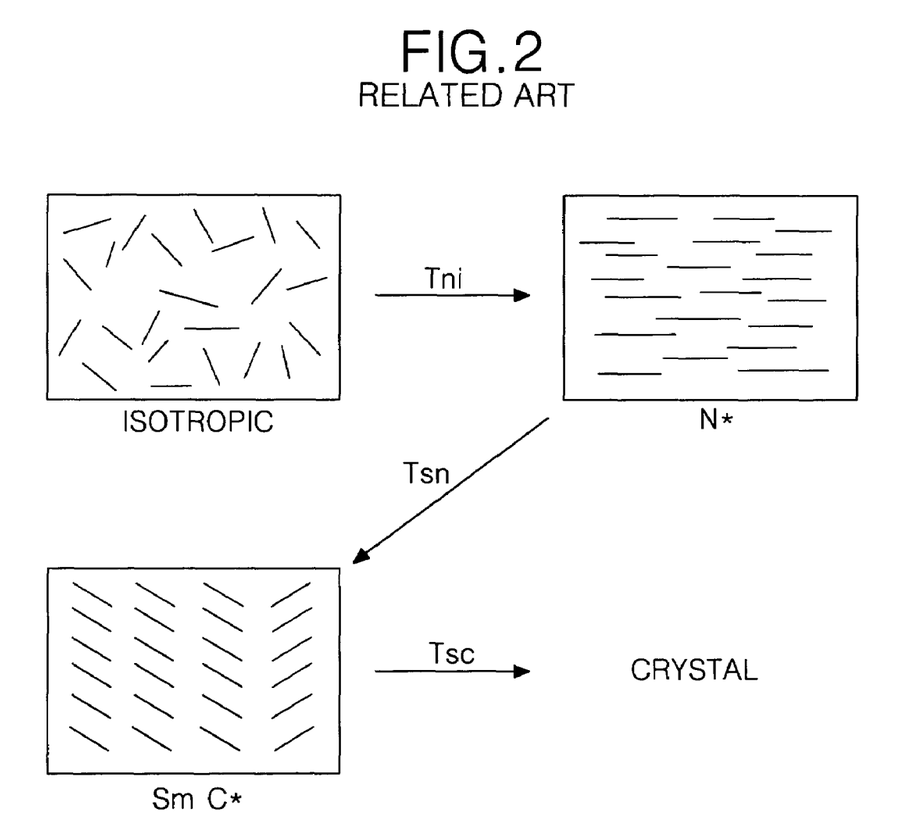
FIG. 2 is a diagram illustrating a phase transition process of ferroelectric liquid crystal of Half-V Switching mode.

In respect to the Half V-Switching Mode shown in FIG. 2, a phase transition occurs from the isotropic phase to the nematic phase N* as the temperature is lowered below a transition temperature Tni. Below a transition temperature Tsn, a phase transition occurs from the nematic phase N* to the smectic C phase Sm C*. Below a transition temperature Tcs a phase transition from the smectic C phase to crystal. Thus, the thermodynamical phase transition occur in a sequence of isotropic→the nematic N*→the smectic C phase Sm C*→crystal.

Figure 3:
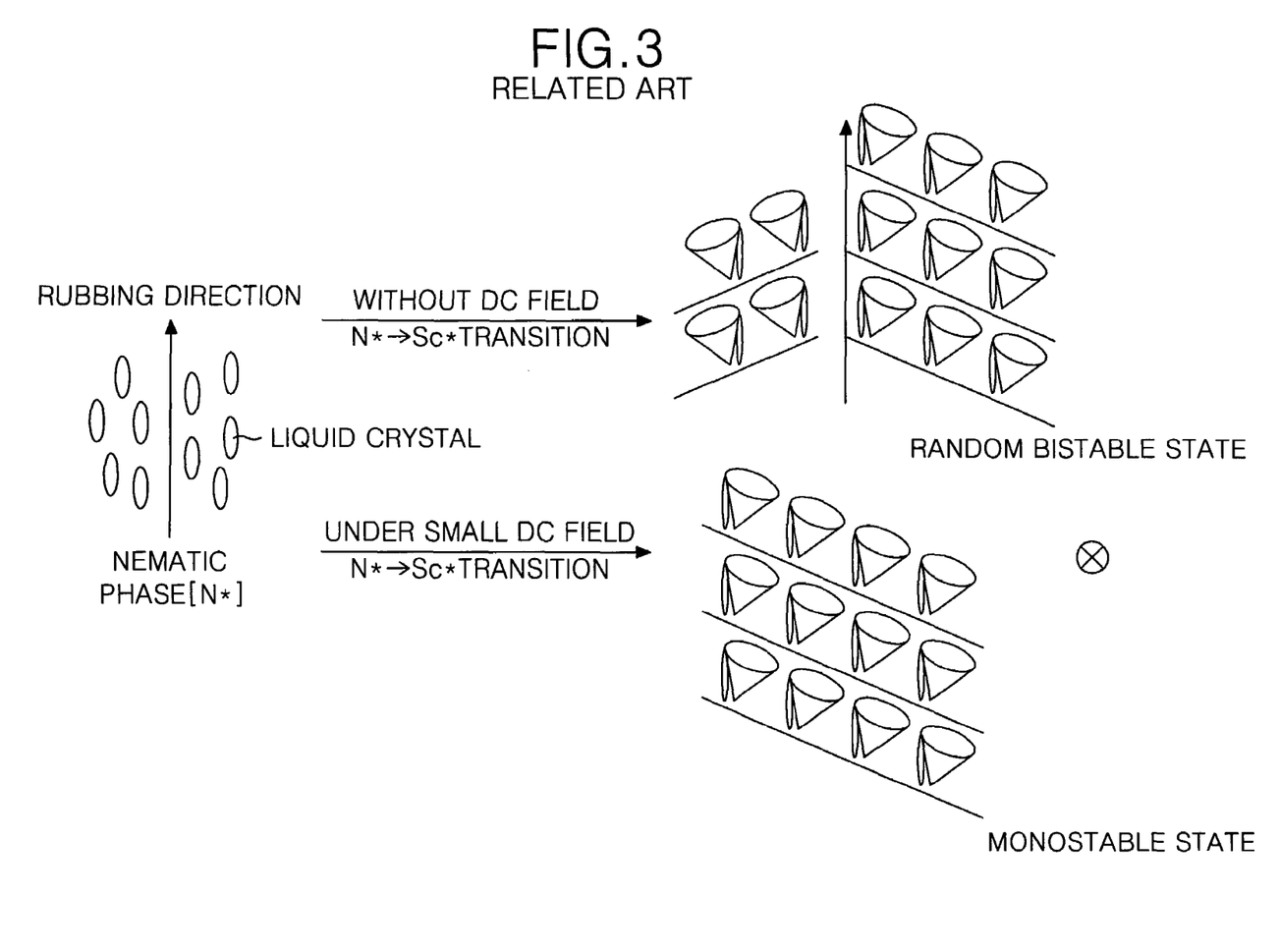
FIG. 3 is a diagram illustrating a change of a molecule arrangement according to an electric field whether or not a ferroelectric liquid crystal is Half V-Switching mode.

Phase transitions will be further explained with reference to FIG. 3 in regard to the method for making a Half V-Switching Mode liquid crystal cell. FIG. 3 is a diagram illustrating a change of a molecule arrangement according to an electric field whether or not a ferroelectric liquid crystal is Half V-Switching mode. The ferroelectric liquid crystal is injected into cells having a parallel alignment films at the incipient temperature of the isotropic phase without direction or location order. If this temperature of ferroelectric liquid crystal in the isotropic phase is lowered to a designated temperature, the ferroelectric liquid crystal goes into the nematic phase N* arranged in parallel with respect to an alignment direction of the alignment films. In the nematic phase N*, if the temperature is gradually lowered and a sufficient alignment electric field is applied inside the liquid crystal cell, the ferroelectric liquid crystal of the nematic phase N* is transititions to the smectic phase C* and the spontaneous polarization direction of the ferroelectric liquid crystal is arranged coincident with the direction of electric field formed inside of cells. As a result, the ferroelectric liquid crystal within the liquid crystal cells has an entirely uniform alignment condition because the spontaneous polarization direction coincides with the direction of an alignment electric field in a two-molecule arrangement direction and the aligned direction of the alignment films disposed on both the upper and lower plates. On the other hand, without the alignment electric field process, the two-molecule arrangement appears as randomly different layers in a transition from the nematic phase N* to the smectic C phase Sm*C. If the bistable state in which the molecular arrangement of the ferroelectric liquid crystal appears random, uniform control of the ferroelectric liquid crystal becomes difficult. Therefore, the ferroelectric liquid crystal cell of the Half V-Mode should be arranged to be in a monostable state by transitioning the ferroelectric liquid crystal from the nematic phase N* to the smectic C phase Sm C* by applying a small DC voltage for an alignment electric field as temperature lowers. In FIG. 3, the "⊗" represents the alignment electric field direction and the spontaneous polarization direction of the ferroelectric liquid crystal coinciding with the direction that vertically enters the drawing in FIG. 3 from above the paper or perpendicular to the plane shown in FIG. 3.

The liquid crystal display adapting the ferroelectric liquid crystal cell of the Half V-Switching Mode has electrodes on its upper and lower plates for vertically applying electric fields across the ferroelectric liquid crystal. Polarizers that are oriented ninety degrees with respect to each other are respectively positioned on the upper and the lower plates.

Figure 4A:
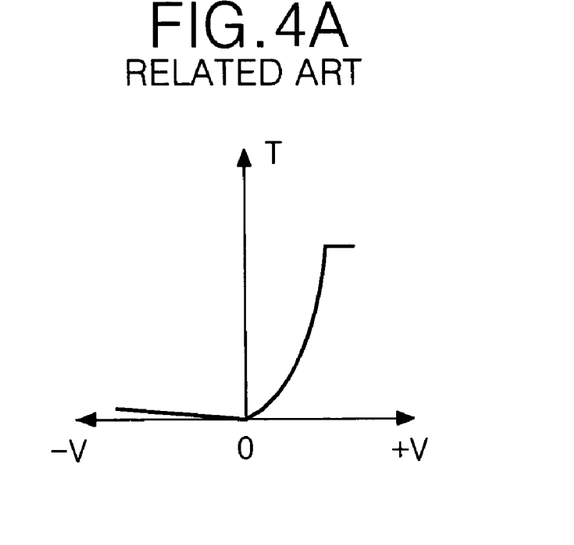
FIGS. 4A and 4B are graphs illustrating the changes of light beam transmittance with respect to voltage changes for the ferroelectric liquid crystal cell in the Half V-Switching Mode.

FIG. 4A and FIG. 4B are graphs illustrating the changes of light beam transmittance with respect to voltage changes for the ferroelectric liquid crystal cell of the Half V-Switching Mode. As shown in FIG. 4A, while being aligned under an alignment electric field from the voltage of a negative polarity −V or the electric field of a negative polarity, the ferroelectric liquid crystal cell of the Half V-Switching Mode allows incident light beam to transmit by converting the polarization direction of the incident light beam to 90° only when a positive voltage +V is applied, and allows incident light beam to cut-off nearly by maintaining the polarization direction of the incident light beam when a negative voltage −V is applied thereto. The light beam transmittance is increased in proportion to the intensity of the positive electric field and is maintained at a maximum value if the intensity of positive electric field increases to more than a designated threshold value.

Figure 4B:
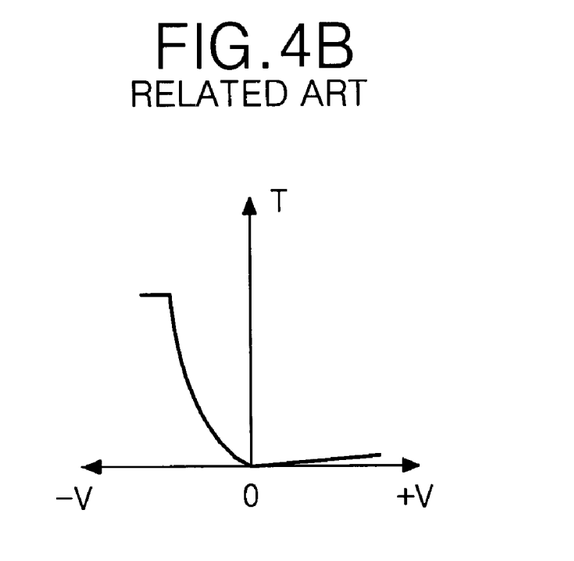

On the contrary, when the ferroelectric liquid crystal of the Half V-Switching Mode cell is aligned under an alignment electric field from the voltage of a positive polarity +V or the electric field of positive polarity, the ferroelectric liquid crystal cell of the Half V-Switching Mode, as illustrated in FIG. 4B, permits incident light beam to transmit only when a negative voltage −V is applied thereto and nearly cuts off incident light beam when a positive voltage +V is applied thereto.

Figure 5:
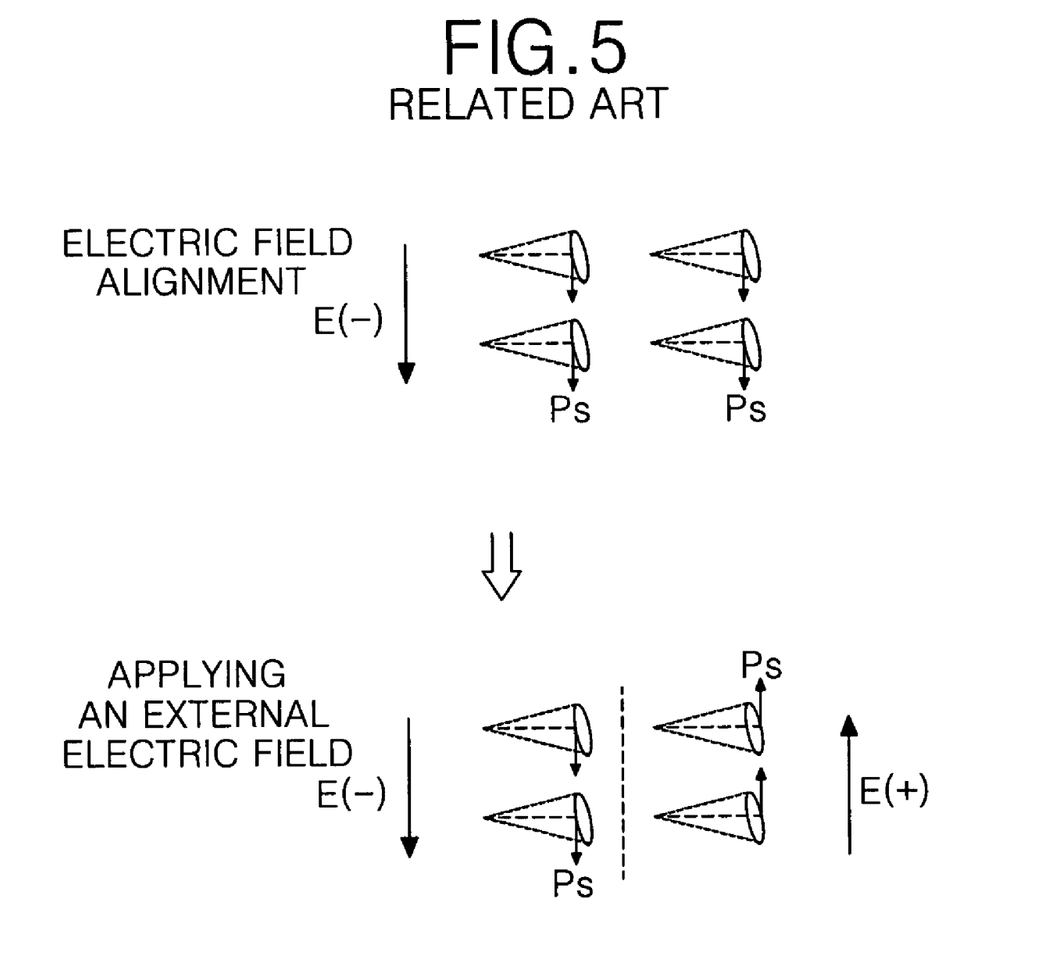
FIG. 5 is a diagram illustrating a ferroelectric liquid crystal of Half V-Switching mode reacting to an applied electric field when being driven by alignment electric field.

FIG. 5 is a diagram illustrating a ferroelectric liquid crystal of Half V-Switching mode reacting to an applied electric field when being driven by alignment electric field. More specifically, FIG. 5 represents the change of the arrangement of the ferroelectric liquid crystal under an alignment electric field of negative polarity and the arrangement of the ferroelectric liquid crystal changes when the external electric field of positive polarity and negative polarity is applied to the ferroelectric liquid crystal cell the Half V-Switching Mode. As shown in FIG. 5, when the ferroelectric liquid crystal cell of Half V-Switching Mode is aligned under an electric field by an external electric field of negative polarity, the spontaneous polarization direction Ps of the ferroelectric liquid crystal is uniformly aligned to the direction coinciding with the external electric field of negative polarity. After the external electric field of positive polarity E+ is applied to the ferroelectric liquid crystal cell, the arrangement of ferroelectric liquid crystal is changed and the spontaneous polarization direction Ps coincides with the external electric field of positive polarity. At this moment, the polarization direction of incident light beam from the lower plate of liquid crystal display is changed to the polarization direction of an upper polarizer by the ferroelectric liquid crystal that has a changed arrangement such that the incident light beam transmits through the upper plate. When the external electric field of negative polarity E− is applied or the external electric field is not applied to the ferroelectric liquid crystal cell of the Half V-Switching Mode, the arrangement of the ferroelectric liquid crystal still maintains the incipient arrangement state and the incident light beam is cut off by the ferroelectric liquid crystal cell because the polarization direction of the ferroelectric liquid crystal is maintained.

Figure 6A:
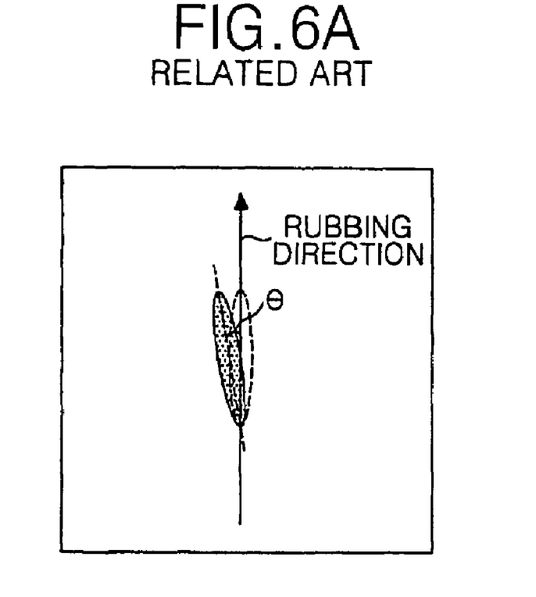
FIGS. 6A-6D a diagram illustrating an arrangement of a ferroelectric liquid crystal of Half V-Switching mode according to an alignment direction of an alignment film.
Figure 6B:
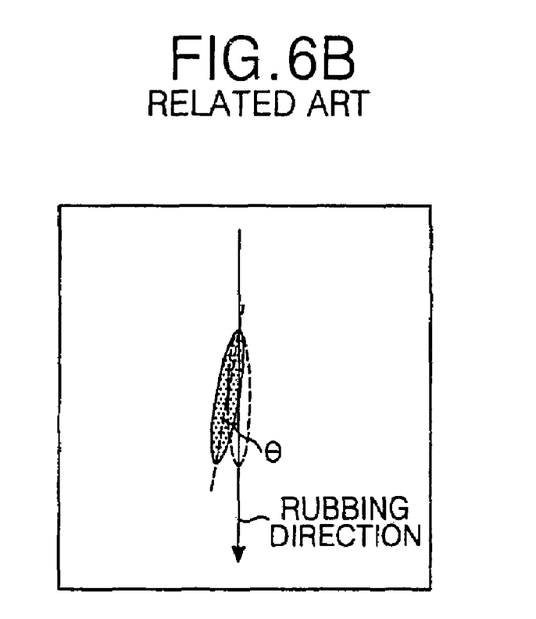
Figure 6C:
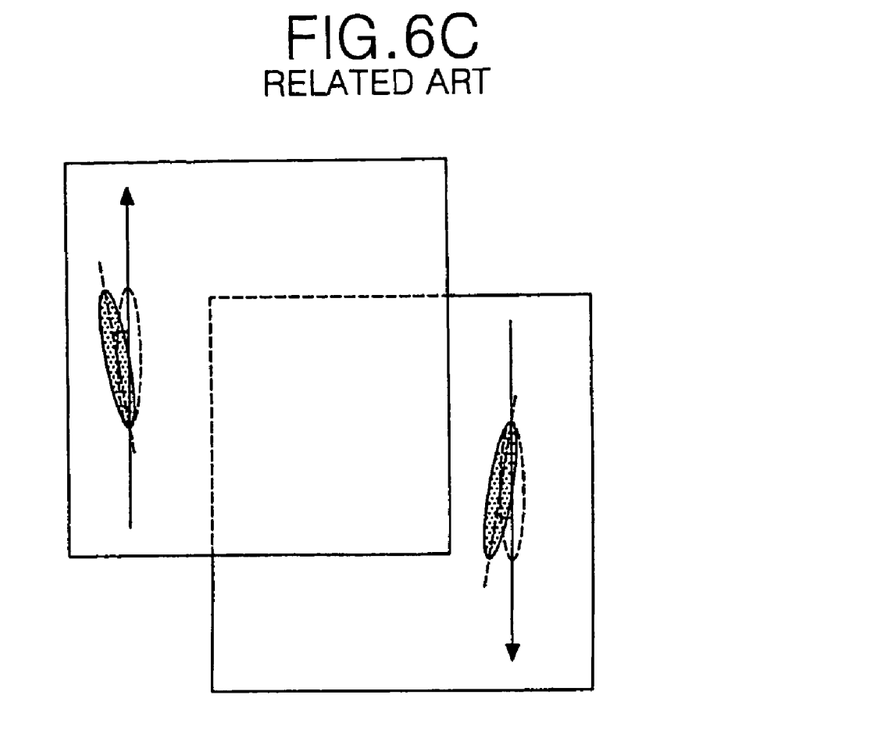
Figure 6D:
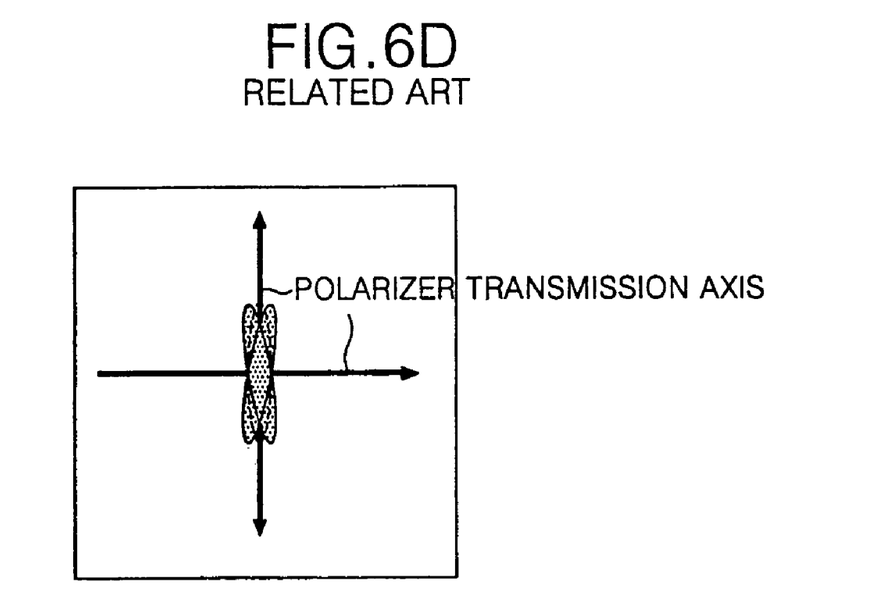

The ferroelectric liquid crystal cell of the Half V-Switching mode has a defect in that light leakage occurs since a long axis of the liquid crystal molecules is tilted somewhat in response to the arrangement direction of the alignment films. The upper and lower alignment films of the ferroelectric liquid crystal cell are aligned in opposite directions. As shown in FIGS. 6A and 6B, the ferroelectric liquid crystal molecules adjacent to the upper and lower plates are tilted to the right with respect to the alignment direction of the alignment film. In this regard, a pre-tilt angle θ of the ferroelectric liquid crystal molecule to the alignment direction becomes approximately 5 degrees. As shown in FIG. 6C, the pre-tilt angles appear to be in the same direction when the upper and lower plates are assembled in the same direction, since the upper plate is turned over and attached to the lower plate.

Figure 7:
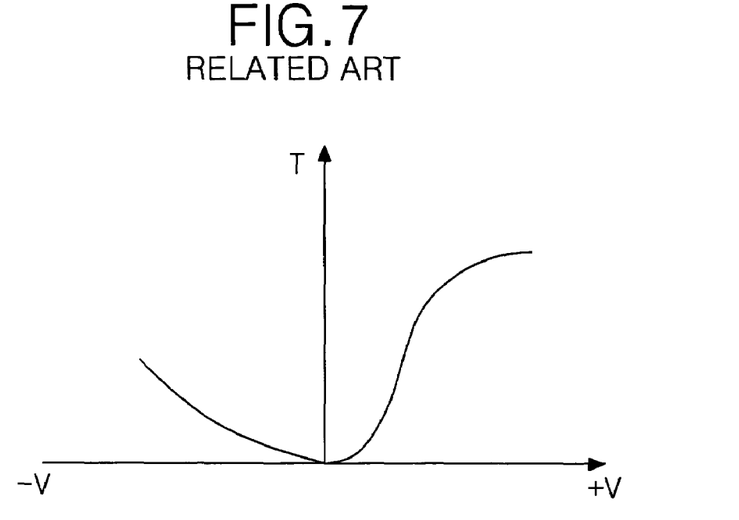
FIG. 7 is a graph illustrating a light transmittance versus a voltage for an arrangement of a ferroelectric liquid crystal having a pre-tilt angle as shown in FIG. 6.

The light transmittance characteristic of the ferroelectric liquid crystal cell when no voltage is applied should be a black state such that no light is transmitted. However, light is transmitted due to the ferroelectric liquid crystal molecules adjacent to the alignment film surface having a pre-tilt such that the liquid crystal cell has a brightness more than that of the black state. For example, if the voltage of a negative polarity −V is applied at incipient alignment of the ferroelectric liquid crystal, the ferroelectric liquid crystal cell reacts upon the voltage of positive polarity +V and thus induces the change of the light transmittance in accordance with the change of the voltage of the positive polarity +V. As described above, if the ferroelectric liquid crystal molecules have a pre-tilt angle θ, a reaction does not arise, as described with respect to FIG. 4A, and the light is not cut off completely in respect to the voltage of the negative polarity and some light is transmitted, as shown in FIG. 7. In respect to the voltage of the positive polarity +V, a sufficient amount of light cannot be transmitted. So in the ferroelectric liquid crystal of the prior art, the leakage phenomenon of light also arises upon black state and the contrast ratio is low and the brightness is deteriorated and further implement of the gray scale embodiment becomes difficult.

SUMMARY OF THE INVENTION

Accordingly, the present invention is directed to a liquid crystal display and a fabricating method thereof that substantially obviate one or more of the problems due to limitations and disadvantages of the related art.

An object of the present invention to provide the ferroelectric liquid crystal display and the fabricating method thereof capable of improving the brightness and the contrast ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, the liquid crystal display according to an aspect of the present invention includes a liquid crystal injected between upper and lower plates, wherein the upper and lower plates have electrodes respectively formed thereon, an upper alignment film formed on the upper plate and a lower alignment film formed on the lower plate, wherein only one of the alignment films on the upper plate and the lower plate is aligned in to determine an incipient alignment direction of the liquid crystal.

In another aspect, a fabricating method of a liquid crystal display includes printing alignment films on an upper plate and a lower plate respectively, wherein the upper and lower plates have electrodes respectively formed thereon, aligning only one of the alignment film of the upper plate and the alignment film of the lower plate, assembling the upper plate and the lower plate and injecting a liquid crystal between the joined upper and lower plates.

In another aspect, the fabricating method of a liquid crystal display includes the steps of printing an alignment film on one of an upper plate and a lower plate, wherein the upper and lower plates have electrodes respectively formed thereon, aligning the alignment film, assembling the upper plate and the lower plate, and injecting a liquid crystal between the joined upper and lower plates while applying an electric field.

In another aspect, a liquid crystal display includes a liquid crystal injected between upper and lower plates, a liquid crystal injected between upper and lower plates, wherein the upper and lower plates have electrodes respectively formed thereon, an alignment film formed on one of the upper and lower plates such that the alignment film is aligned to determine an incipient alignment direction of the liquid crystal, and an electric field for maintaining an incipient alignment direction of the liquid crystal.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 8:
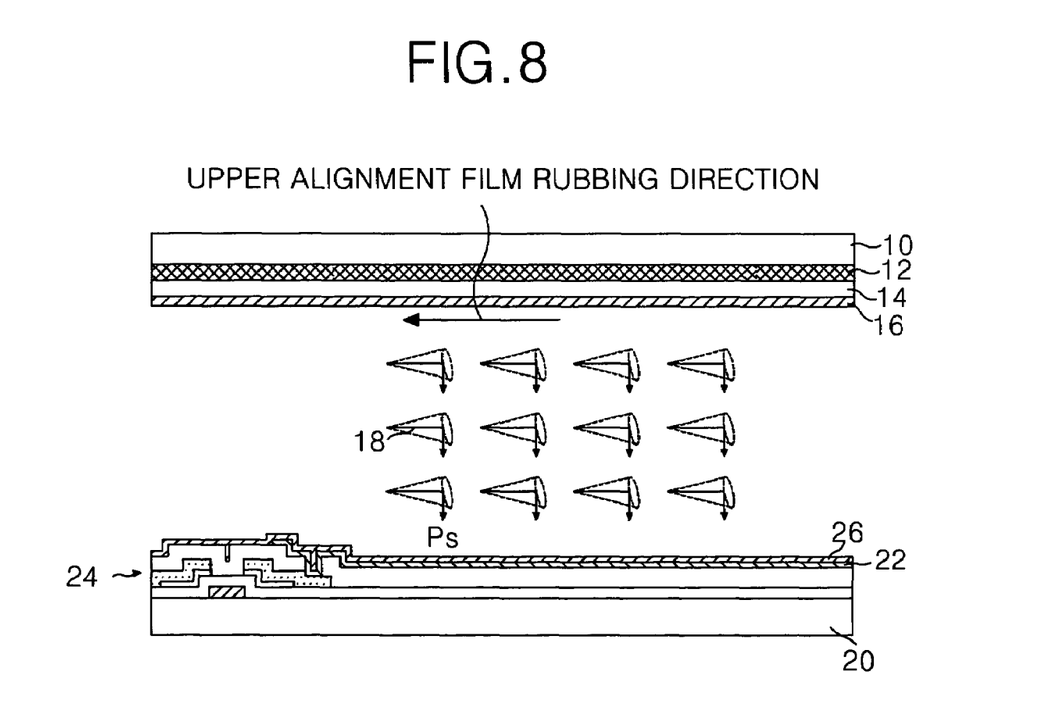
FIG. 8 is a diagram illustrating a liquid crystal display according to an embodiment of a present invention.

As shown in FIG. 8, the liquid crystal display according to an embodiment of the present invention comprises an upper plate including a color filter array 12, a common electrode 14 and an upper alignment film 16 stacked on an upper substrate 10; and a lower plate including a TFT array 24, a pixel electrode 22 and a lower alignment film 26 stacked on a lower substrate 20. A sealant (not shown) to seal the ferroelectric liquid crystal 18 is applied along the outer edges between the upper and the lower plates and a spacer to keep a cell gap is formed in the inner space between the upper and the lower plates. The liquid crystal display of the present example further includes an upper polarizer plate 27 mounted on an external surface of the upper substrate 10 and a lower polarizer plate 28 mounted on an external surface of the lower substrate 20. The polarization axis of the upper polarizer and the lower polarizer cross vertically each other.

In the liquid crystal display according to the embodiment of the present invention, only one of the upper alignment film 16 and the lower alignment film 26 is aligned or rubbed. For example, the upper alignment film 16 can be aligned to a designated direction, while the lower alignment film 20 is not aligned or not used. Thus, uniform arrangement of the liquid crystal only occurs with the assistance of one alignment film, such as upper alignment film 16 in this example. Alternatively, the upper alignment film 16 may not be aligned, but only the lower alignment film 26 may be aligned or only the lower alignment film 26 is used. In this case, the ferroelectric liquid crystal 18 is arranged uniformly in respect to the alignment direction of the lower alignment film 26.

In other words, in the liquid crystal display according to the embodiment of the present invention, both the upper alignment film 16 and the lower alignment film 26 are not aligned as in the related art, and only one of the upper alignment film 16 and the lower alignment film 26 is aligned and/or used. Since only one of alignment films 16 or 26 is aligned as described above, only an alignment film 16 or 26 that is aligned affects the ferroelectric liquid crystal 18. So as compared with the related art where both of two alignment films are aligned, there is less light leakage. In addition the present invention has an advantage in that the number of the fabrication processes are reduced since only one alignment film is aligned and/or used.

Figure 9:
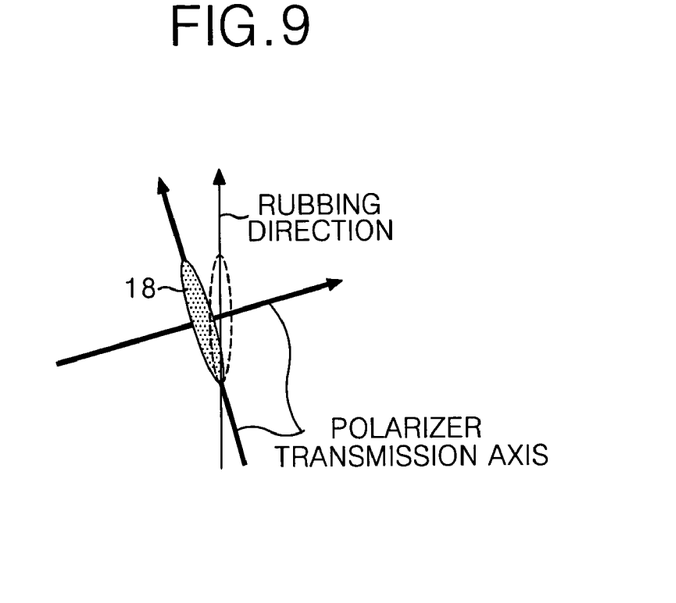
FIG. 9 is a diagram illustrating an arrangement of the ferroelectric liquid crystal shown in FIG. 8.

Because the ferroelectric liquid crystal 18 will be pre-tilted with respect to the alignment direction of an alignment film, as shown in FIG. 9, the polarizer is arranged in respect to the alignment direction such that the tilted long axis of the ferroelectric liquid crystal 18 and transmission axis of the polarizer of at least one of two polarizers may coincide. According to the above arrangement, it is possible to prevent the phase delay of the light due to discrepancy of the transmission axis of the polarizer and the long axis of the ferroelectric liquid crystal 18. Thus, light leakage can be minimized. Furthermore, the polarizers that are respectively mounted on the upper and the lower plates such that the transmission axis of at least one of the polarizers respectively mounted in the upper and the lower plate may be tilted at an angle within a range of 1 to 10 degrees with respect to the alignment direction of the alignment film. Preferably, the tilt angle range between the transmissive axis of the polarizer and the alignment film is between 3 to 7 degrees.

Figure 10A:
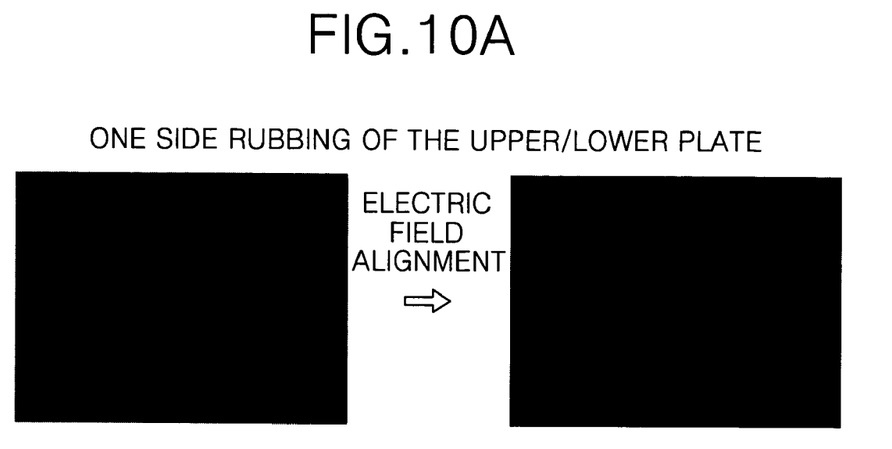
FIG. 10A represents a picture quality before and after alignment under electric field of the related art liquid crystal display in which both of the upper and the lower alignment films are aligned.
Figure 10B:
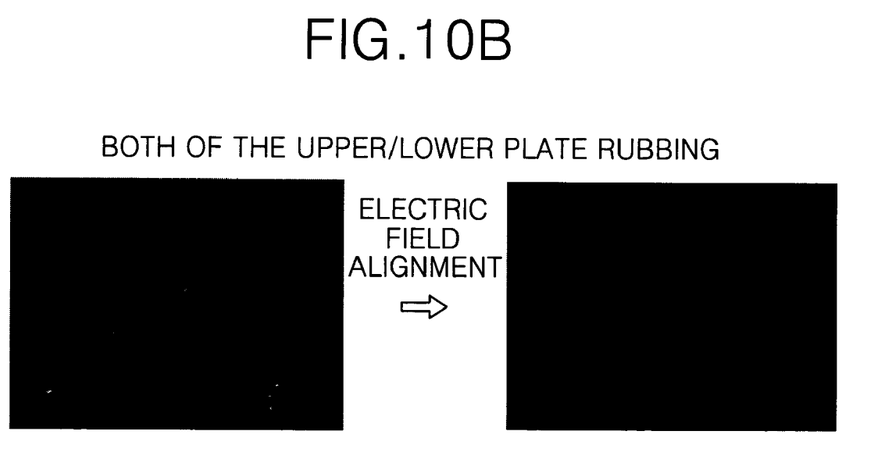
FIG. 10B represents a picture quality before and after electric field alignment of the liquid crystal display in which only one alignment film of the upper and lower plates is aligned.

With reference to FIGS. 10A and 10B, the light characteristics of various liquid crystal displays are compared. FIG. 10A represents a picture quality before and after alignment under electric field of the related art liquid crystal display in which both of the upper and the lower alignment films are aligned. FIG. 10B represents a picture quality before and after electric field alignment of the liquid crystal display in which only one alignment film of the upper and the lower plates is aligned.

The related art liquid crystal display shown in FIG. 10A in which both the upper and lower alignment films respectively on the upper and the lower plates are aligned has a picture quality worse than that of the present invention shown in FIG. 10B. That is, the present invention has an arrangement state of the liquid crystal molecules prior to an alignment electric field that is superior to the related art. Due to the superior alignment state in the present invention of the liquid crystal molecules, it is possible to display a high picture quality. Therefore, there is an advantage in that the liquid crystal molecules need not be subject to an alignment electric field.

If only one alignment film is aligned in a device that does not use an alignment electric field, a designated level of uniform alignment can be attained. However, such an arrangement may result in a black state that is not as good as in a normal black state or the whole brightness is lowered. Accordingly, after one alignment film is aligned and the upper and the lower plates are assembled, the liquid crystal may be injected between the upper and the lower plates while applying an alignment electric field. When the electric field is applied, as shown in photographs of FIGS. 10A and 10B, the picture quality in the normal black state is improved in accordance with the improved alignment state of the liquid crystal molecules. In FIGS. 10A and 10B, the normal black state in the related art and the present invention is not exactly the same under the alignment electric field. An explanation of the differences in the black state in FIGS. 10A and 10B will be made with reference to the FIG. 11.

Figure 11:
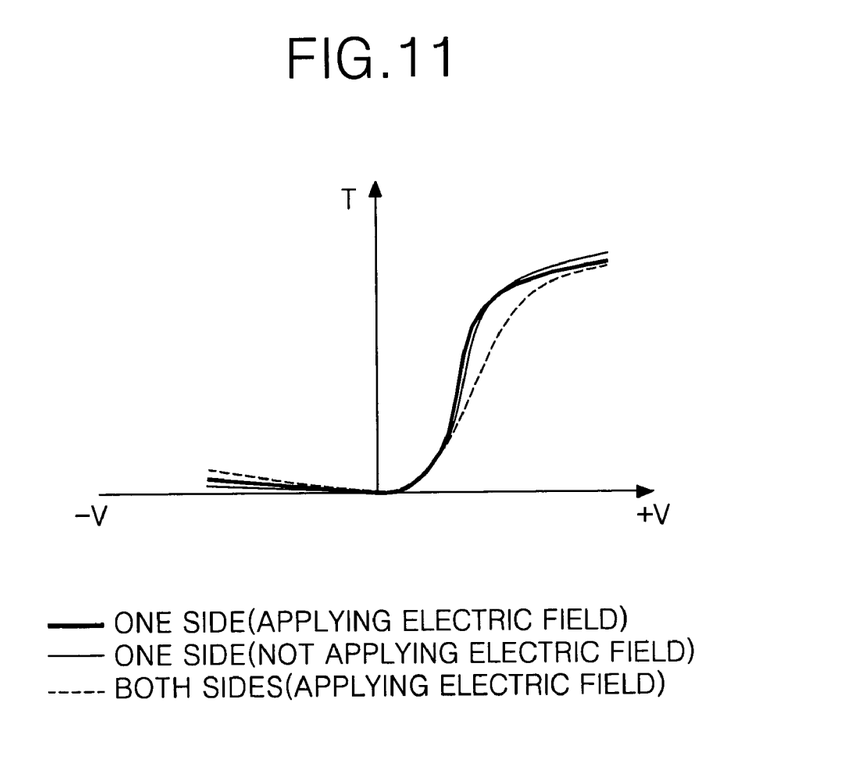
FIG. 11 is a diagram illustrating a light transmittance versus a voltage of liquid crystal displays according to an embodiment of the present invention and a device of the related art.

FIG. 11 is a diagram illustrating the voltage change according to the alignment method of both the related art and the present invention in terms of the light transmittance versus voltage, that is, a T-V curve. As shown in FIG. 11, when both the upper and lower alignment films are aligned, the transmittance (T) of the T-V curve is lowered in terms of transmittance versus voltage in an on-state as compared to the case, where only one of the upper and lower alignment films are aligned. Further, the optical characteristic of the liquid crystal display, having both alignment films aligned and an alignment electric field applied, is deteriorated conspicuously more than that of the liquid crystal display in which only one alignment film is aligned or only one alignment film is aligned under an alignment electric field. In other words, light leakage does not substantially occur when the negative voltage (−V) is applied and the transmission characteristic is better when the positive voltage (+V) is applied as compared with the related art having alignment films aligned on both the upper and lower plates.

The reason that the liquid crystal molecules can be aligned by aligning only one alignment film in the upper and the lower plates according to the present invention is that one side of alignment energy of the ferroelectric liquid crystal molecule can be fully delivered to the other side with only one side alignment due to the narrow cell gap of the ferroelectric liquid crystal display that is about 1.4 microns for example. As described above, aligning both alignment films on both the upper and lower plate of the related art lowers the brightness by tilting the liquid crystal molecules. Since one side alignment of the present invention makes the molecules tilt to the designated direction, the loss of the brightness can be minimized. Further, in respect to the present invention, if the alignment under electric field is carried out with only one alignment film aligned, the contrast ratio as well as the brightness is further improved as the T-V curve becomes more vertical. Thus, the implementation of gray scale is further simplified.

As described above, the liquid crystal display and the fabricating method thereof according to the present invention aligns only one alignment film of the upper and the lower alignment films of the upper and the lower plates. As a result, the liquid crystal display and the fabricating method thereof according to the present invention improve the brightness and the contrast ratio. Further, the liquid crystal display and the fabricating method thereof according to the present invention, achieves an improvement in the brightness and the implement of a gray scale. Since the liquid crystal display and the fabricating method thereof according to the present invention can omit the alignment process of the alignment film in contrast with the related art, its fabricating process is reduced and the production efficiency is improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:
    a liquid crystal injected between upper and lower plates maintains a monostable state, wherein the upper and lower plates have electrodes respectively formed thereon;
    an upper alignment film formed on the upper plate; and
    a lower alignment film formed on the lower plate, wherein only one of the alignment films on the upper plate and the lower plate is aligned to determine an incipient alignment direction of the liquid crystal; and
    polarizers mounted on external surfaces of the upper and lower plates respectively, wherein a tilted long axis of the liquid crystal is coincident with a transmission axis of at least one of the polarizers, wherein the transmissive axis of at least one of the polarizers is at angle within a range of 9 to 10 degrees with respect to an alignment direction of the aligned one of the upper and lower alignment films, and the liquid crystal is a ferroelectric liquid crystal of Half V-Switching mode.

2. The liquid crystal display according to claim 1, wherein the upper alignment film is aligned.

3. The liquid crystal display according to claim 1, wherein the lower alignment film is aligned.

4. The liquid crystal display according to claim 1, wherein a cell gap between the upper plate and the lower plate is 1.4~1.5 microns.

5. A fabricating method of a liquid crystal display, comprising the steps of:

printing alignment films on an upper plate and a lower plate respectively, wherein the upper and lower plates have electrodes respectively formed thereon;

aligning only one of the alignment film of the upper plate and the alignment film of the lower plate;

assembling the upper plate and the lower plate; and injecting a liquid crystal between the joined upper and lower plates; and mounting polarizers on external surfaces of the upper and lower plates respectively, wherein a long axis of the liquid crystal is coincident with a transmission axis of one of the polarizers, wherein the transmissive axis of the one of the polarizers is at angle within a range of 9 to 10 degrees with respect to an alignment direction of the aligned alignment film, and the liquid crystal is a ferroelectric liquid crystal of Half V-Switching mode.

6. The fabricating method of the liquid crystal display according to claim 5, wherein the step of injecting includes injecting the liquid crystal while applying an alignment electric field.

7. The fabricating method of the liquid crystal display according to claim 5, further comprising:

applying a DC Voltage to the liquid crystal while the liquid crystal is transmitting from a nematic phase to a smectic C phase, thereby maintaining a monostable state.

* * * * *